US010057616B1

(12) United States Patent
Thompson et al.

(10) Patent No.: US 10,057,616 B1
(45) Date of Patent: Aug. 21, 2018

(54) SYSTEMS AND METHODS FOR ACCESSING BOOKMARKED CONTENT

(71) Applicant: The DIRECTV Group, Inc., El Segundo, CA (US)

(72) Inventors: Matthew J. Thompson, El Segundo, CA (US); Michael C. Stickley, Long Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 14/592,825

(22) Filed: Jan. 8, 2015

(51) Int. Cl.
*H04N 21/262* (2011.01)
*H04N 21/436* (2011.01)
*H04N 21/231* (2011.01)
*H04N 21/472* (2011.01)
*H04N 21/8547* (2011.01)
*H04N 21/41* (2011.01)
*H04N 21/235* (2011.01)
*H04N 21/81* (2011.01)
*H04N 21/84* (2011.01)

(52) U.S. Cl.
CPC ..... *H04N 21/26283* (2013.01); *H04N 21/231* (2013.01); *H04N 21/2353* (2013.01); *H04N 21/4122* (2013.01); *H04N 21/43615* (2013.01); *H04N 21/47214* (2013.01); *H04N 21/8133* (2013.01); *H04N 21/84* (2013.01); *H04N 21/8547* (2013.01)

(58) Field of Classification Search
CPC ............... H04N 21/04; H04N 21/472; H04N 21/26283; H04N 21/47214; H04N 21/47217; H04N 21/84; H04N 21/231; H04N 21/43615; H04N 21/8547; H04N 21/4122; H04N 21/2353; H04N 21/8133
See application file for complete search history.

(56) References Cited

U.S. PATENT DOCUMENTS

| 8,488,942 B2 | 7/2013 | Smith et al. |
| 2007/0150930 A1 | 6/2007 | Koivisto et al. |
| 2008/0229205 A1 | 9/2008 | Lee et al. |
| 2009/0119328 A1 | 5/2009 | Raza et al. |
| 2009/0254823 A1* | 10/2009 | Barrett ................ H04N 21/235 715/716 |

(Continued)

OTHER PUBLICATIONS

Cable Television Laboratories, Inc.; "CableLabs® VOD Content Specification Version 1.1"; Metadata Specifications; MD-SP-VOD-CONTENT1.1-I05-060831; pp. 6-25; Aug. 31, 2006.

*Primary Examiner* — Benjamin R Bruckart
*Assistant Examiner* — Tien M Nguyen
(74) *Attorney, Agent, or Firm* — Harness, Dickey & Pierce, PLC

(57) ABSTRACT

A system includes a user receiving device that receives content broadcast from a service provider, presents the received content on a display to be viewed by a user, receives a bookmark request signal generated in response to input from the user, generates a bookmark based on the bookmark request signal, and transmits the bookmark from the user receiving device. A storage device remotely located from the user receiving device receives the bookmark from the user receiving device and stores the bookmark with a plurality of bookmarks associated with the user. The plurality of bookmarks stored in the storage device are accessible by the user using a second screen device.

14 Claims, 10 Drawing Sheets

(56) References Cited

U.S. PATENT DOCUMENTS

| | | | |
|---|---|---|---|
| 2010/0027966 A1* | 2/2010 | Harrang | H04N 5/775 |
| | | | 386/241 |
| 2010/0154012 A1* | 6/2010 | Clavenna | H04N 7/17318 |
| | | | 725/109 |
| 2010/0169942 A1 | 7/2010 | Dasher | |
| 2010/0269144 A1 | 10/2010 | Forsman et al. | |
| 2011/0075841 A1 | 3/2011 | Chen et al. | |
| 2011/0075990 A1* | 3/2011 | Eyer | H04N 5/76 |
| | | | 386/241 |
| 2012/0275764 A1* | 11/2012 | Eyer | H04N 21/8133 |
| | | | 386/241 |
| 2015/0086180 A1* | 3/2015 | Pan | H04N 21/47214 |
| | | | 386/241 |
| 2015/0181300 A1* | 6/2015 | Rajan | H04N 21/47214 |
| | | | 725/58 |

* cited by examiner

SYSTEMS AND METHODS FOR ACCESSING BOOKMARKED CONTENT

TECHNICAL FIELD

The present disclosure relates generally to providing data associated with content viewed by a user, and, more specifically, providing the data associated with the content in response to receiving input from the user during viewing of the content.

BACKGROUND

The statements in this section merely provide background information related to the present disclosure and may not constitute prior art.

A user of a television or other viewing device may use a second device (i.e., a "second screen" device) to access additional data about content provided on the television. For example, the user may access a tablet, smartphone, or other computing device to search for additional data about the content viewed on the television, and/or to share data about the content (e.g., via a social networking app). The additional content may include interactive content associated with the viewed content.

Typically, the user accesses the second screen device in realtime (e.g., with respect to the content viewed on the television). For example, the second screen device may implement a mobile app or other application associated with the viewed content and/or a provider of television programming content.

SUMMARY

The present disclosure relates to systems and methods for generating and storing bookmarks associated with content provided to a user. The bookmarks are stored in cloud storage or another remote location and are accessible by the user using a second screen device.

In one aspect of the disclosure, a system includes a user receiving device that receives content broadcast from a service provider, presents the received content on a display to be viewed by a user, receives a bookmark request signal generated in response to input from the user, generates a bookmark based on the bookmark request signal, and transmits the bookmark from the user receiving device. A storage device remotely located from the user receiving device receives the bookmark from the user receiving device and stores the bookmark with a plurality of bookmarks associated with the user. The plurality of bookmarks stored in the storage device are accessible by the user using a second screen device.

In a further aspect of the disclosure, a method includes receiving, using a user receiving device, content broadcast from a service provider, presenting the received content on a display to be viewed by a user, receiving a bookmark request signal generated in response to input from the user, generating a bookmark based on the bookmark request signal, transmitting the bookmark from the user receiving device, using a storage device remotely located from the user receiving device, and storing the bookmark with a plurality of bookmarks associated with the user. The plurality of bookmarks stored in the storage device are accessible by the user using a second screen device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
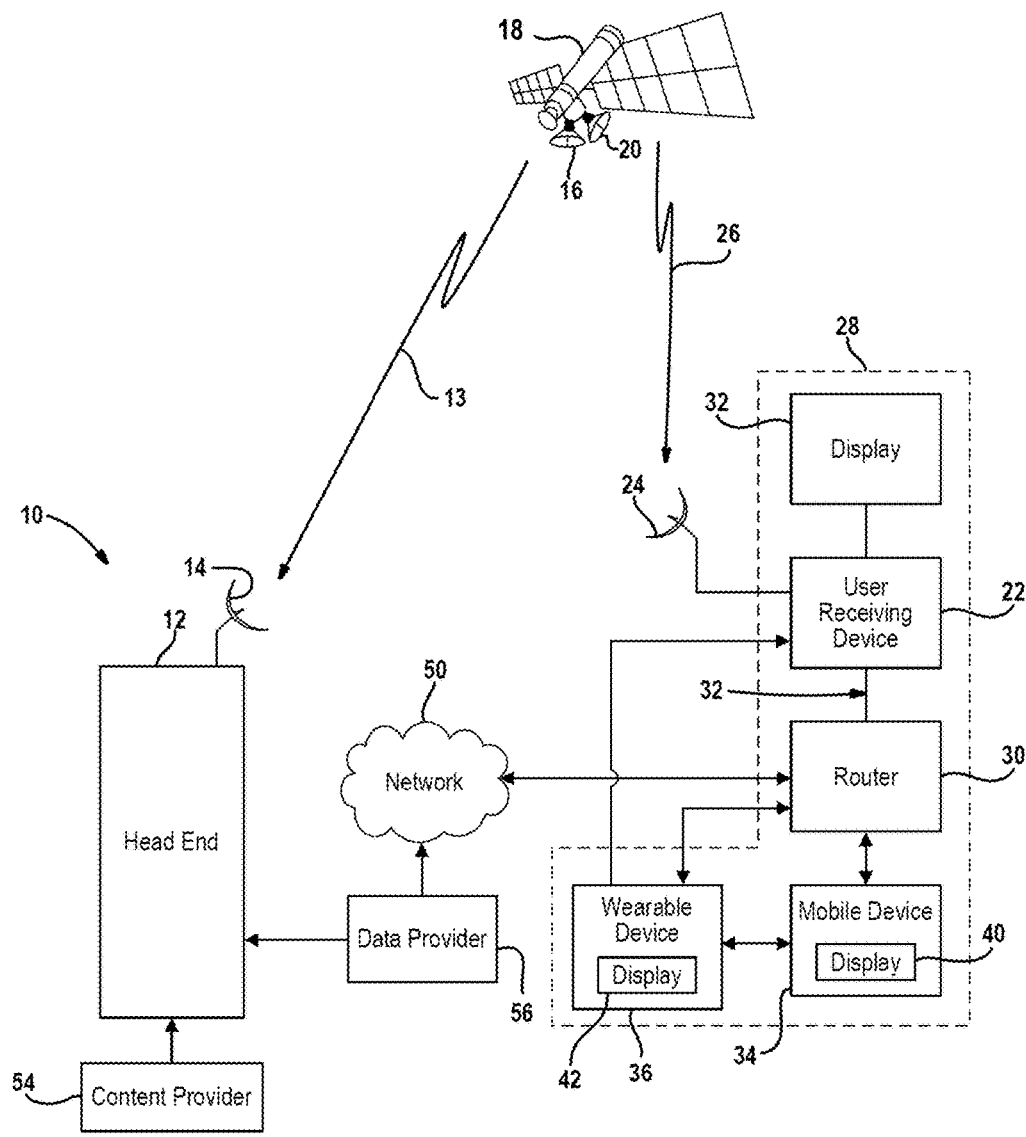
FIG. 1 is a block diagrammatic view of a communication system according to one example of the present disclosure.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The teachings of the present disclosure can be implemented in a system for communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented in analog circuitry, digital circuitry or combinations thereof. Further, the computing device may include a microprocessor or microcontroller that performs instructions to carry out the steps performed by the various system components.

A content or service provider is also described. A content or service provider is a provider of data to the end user. The service provider, for example, may provide data corresponding to the content such as metadata as well as the actual content in a data stream or signal. The content or service provider may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, advertising, etc. Additionally, throughout this disclosure reference is made to data, content, information, programs, movie trailers, movies, advertising, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

While the following disclosure is made with respect to example DIRECTV® broadcast services and systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a service provider and integrated receiver/decoders (IRDs) as described below can be reallocated as desired without departing from the intended scope of the present patent.

Referring now to FIG. 1, a satellite television broadcasting system 10 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. Therefore the user receiving device 22 may be referred to as a television receiving device or set top box. More than one user receiving device 22 may be included within a system or within a building 28. The user receiving devices 22 may be interconnected.

The user receiving device 22 may be in communications with a router 30 that forms a local area network 32 with other devices including, but not limited to, a mobile device 34 and a wearable device 36. The other devices may correspond to "second screen" devices. The router 30 may be a wireless router or a wired router or a combination of the two. For example, the user receiving device 22 may be wired to the router 30 and wirelessly coupled to the mobile device 34 and to the wearable device 36. The router 30 may communicate internet protocol (IP) signals to the user receiving device 22. The IP signals may be used for controlling various functions of the user receiving device 22. IP signals may also originate from the user receiving device 22 for communication to other devices such as the mobile device 34 or the wearable device 36 through the router 30. The mobile device 34 and the wearable device 36 may also communicate signals to the user receiving device 22 through the router 30. The mobile device 34 may be a mobile phone, tablet computer, laptop computer or any other type of computing device.

The wearable device 36 may be one of a number of types of wearable devices that are worn by a user. The wearable device 36 may be fixed wearable by a user meaning it is meant to be fixed to the user. Examples of wearable devices 36 include a computerized watch such as a Samsung® or Apple® watch. The watch devices are fixed to an arm of the user. Another example of a wearable device 36 is GOOGLE GLASS® which is fixed to a head of a user. Of course, other types of wearable devices affixed to other parts of the body may be used. The wearable device 36 may be in direct communication with the user receiving device 22 and the mobile device 34 through a Bluetooth® connection. The wearable device 36 may also be in communication with the user receiving device 22 and the mobile device 34 through an IP connection through the router 30. The wearable device 36 may also be in communication with devices outside the local area network 32 through the router 30. That is, the wearable device 36 may communicate with other devices such as the head end 12 through the network 50. The wearable device 36 may also be in communication with the mobile device 34 which provides a bridge or a communication path to the router 30 and ultimately to the user receiving device 22 or the network 50. The wearable device 36 may generate signals such as selection signals that are communicated through the mobile device 34 but are destined to be used by the user receiving device 22, the head end 12 or other user devices in communication with the network 50.

The wearable device 36 may be in communication with the mobile device 34 by way of a Bluetooth® connection. The mobile device 34 may in turn be in communication with the router 30 and various other devices, such as the user receiving device 22 or devices through the network 50 such as the head end 12 or other devices in other parts of the network.

The user receiving device 22 includes a screen display 38 associated therewith. The display 38 may be a television or other type of monitor. The display 38 may display both video signals and audio signals.

The mobile device 34 may also have a display 40 associated therewith. The display 40 may also display video and audio signals. The display 40 may be integrated into the mobile device. The display 40 may also be a touch screen that acts as at least one user interface. Other types of user interfaces on the mobile devices may include buttons and switches.

The wearable device 36 may also have a display 42 associated therewith. The display 42 may also display video and audio signals. The display 42 may be integrated into the wearable device 36. A projected display or user interface may also be projected on a surface adjacent to the eye of a user. The display 42 may also be a touch screen that acts as at least one user interface such as in a wearable watch type device. The device 36 may display function selectors or "buttons" that are other types of user interfaces on the wearable devices may include buttons and switches.

The user receiving device 22 may be in communication with the head end 12 through an external network or simply, network 50. The network 50 may be one type of network or multiple types of networks. The network 50 may, for example, be a public switched telephone network, the internet, a mobile telephone network or other type of network. The network 50 may be in communication with the user receiving device 22 through the router 30. The network 50 may also be in communication with the mobile device 34 through the router 30. Of course, the network 50 may be in direct communication with the mobile device 34 or wearable device 36 such as in a cellular system.

The system 10 may also include a content provider 54 that provides content to the head end 12. Although only one content provider 54 is illustrated, more than one content provider may be used. The head end 12 is used for distributing the content through the satellite 18 or the network 50 to the user receiving device 22, mobile device 34 or the wearable device 36.

A data provider 56 may also provide data to the head end 12. The data provider 56 may provide various types of data such as schedule data or metadata that is provided within the program guide system. The metadata may include various descriptions, actor, director, star ratings, titles, user ratings, television or motion picture parental guidance ratings, descriptions, related descriptions and various other types of data. The data provider 56 may provide the data directly to the head end and may also provide data to various devices such as the mobile device 34, wearable device 36, and the user receiving device 22 through the network 50. This may be performed in a direct manner through the network 50.

In the system 10 according to the present disclosure, a user may provide input (e.g., using a button or other input on a remote control or other device in communication with the user receiving device 22) to "bookmark" a selection of content viewed on the display 32, and review content related to the bookmark at a later time using a second screen device (e.g., hours, days, etc. later) The selection may correspond to a particular moment (e.g., an exact time or a window of time), scene, etc. provided on the display 32 via the user receiving device 22. The content may correspond to programming content, a movie, a commercial, music channel, etc.

The user receiving device 22 receives the input (e.g., "the bookmark request") provided by the user and automatically provides a bookmark corresponding to the bookmark request to remote storage (e.g., the cloud). For example only, the remote storage may be located in and/or correspond to one or more of the head end 12, the network 50, the content provider 54, the data provider 56, or other storage location. The user receiving device 22 may provide the bookmark to the remote storage via the satellite 22 and/or the router 30. For discussion purposes, the remote storage will be referred to herein as "the cloud" or "cloud storage." Cloud storage may also include home network cloud storage, such as a network attached storage device.

Each individual user may have a collection of the bookmarks, associated with the user, stored in the cloud. The bookmarks are accessible to the user at a later time (e.g., hours or days later, or immediately, if desired) via a second screen device (e.g., the mobile device 34, the wearable device 36, another device at a different location, etc.) and/or via the user receiving device 22 and the display 32. For example, the user may use the second screen device to review bookmarks created by the user and stored in the cloud (e.g., using a mobile app or other application, or simply using a web browser), or may use the remote control to review the bookmarks on the display 32.

Selecting a bookmark provides access to additional data (i.e., metadata) associated with the bookmark. In particular, the metadata may correspond to details within the actual viewed content associated with the bookmark. For example, the metadata may correspond to details including, but not limited to, a screen capture or video from the bookmarked scene, a program (i.e., television program) or movie poster, quotes or dialog from the bookmarked scene, information about the music or soundtrack from the bookmarked scene, a geographical location of the bookmarked scene, products featured or used in the bookmarked scene (e.g., clothing, vehicles, etc.), including information associated with purchasing the products, and/or characters, cast, and crew associated with the bookmarked scene.

The user may use the second screen device to browse the collection of bookmarks associated with that user and the corresponding metadata. Further, the user can use the second screen device to perform additional searching related to a specific element of the metadata associated with a selected bookmark (e.g., to search for a product from the bookmarked scene), to share bookmarks or specific metadata via one or more social media networks, and/or to email bookmarks or metadata to other users. Because the collection of bookmarks is stored in the cloud, the user can access the bookmarks and the associated metadata at any time or location, and with any second screen device.

The user may be notified when a new bookmark is created. For example, when the user presses the button on the remote control to bookmark a scene, the user receiving device 22 may communicate with the router 30 and/or the network 50 to provide a notification to the user that the bookmark was created. For example, the user may receive a text message, email, popup, or other notification at the mobile device 34, the wearable device 36, etc. The display 32 may also provide a notification that creation of the bookmark was successful.

Figure 2:
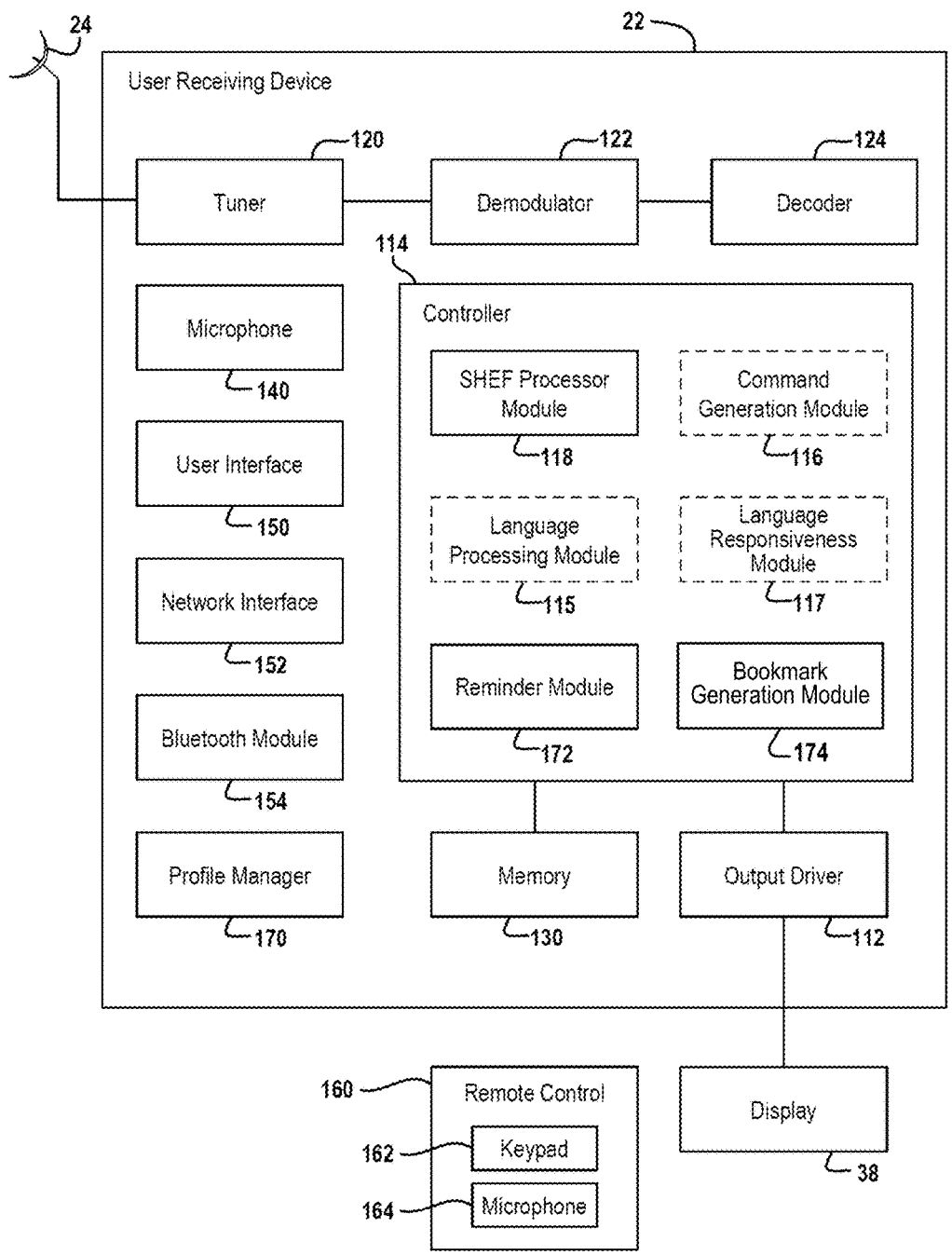
FIG. 2 is a block diagrammatic view of a user receiving device according to one example of the present disclosure.

Referring now to FIG. 2, the user receiving device 22, such as a set top box is illustrated in further detail. Although, a particular configuration of the user receiving device 22 is illustrated, it is merely representative of various electronic devices with an internal controller used as a content receiving device. Each of the components illustrated may be capable of communicating therebetween even though a physical line is not drawn.

The antenna 24 may be one of a number of different types of antennas that includes one or more low noise blocks. The antenna 24 may be a single antenna 24 used for satellite television reception. The user receiving device 22 is in communication with the display 38. The display 110 may have an output driver 112 within the user receiving device 22.

A controller 114 may be a general processor such as a microprocessor that cooperates with control software. The controller 114 may be used to coordinate and control the various functions of the user receiving device 22. These functions may include a tuner 120, a demodulator 122, a decoder 124 such as a forward error correction decoder, a buffer or other functions. The controller 114 may also be used to control various functions of the user receiving device 22.

The controller 114 may also include one or more of a language processing module 115, a command generation module 116, a language responsiveness module 117 and a set-top box HTTP export functionality (SHEF) processor module 118. Each of these modules is an optional feature of the user receiving device 22. As will be described below the functions associated with each of the modules 115-118 may be performed in the user receiving device or one of the other devices such as the head end or the mobile device or a combination of the three. The modules 115-118 may be located remotely from each other and may also be stand-alone devices or vendors on the network 50. In general, the language processing module 115 converts electrical signals that correspond to audible signals into a textual format or textual signal. The command generation module 116 determines a user receiving device control command that corresponds with the textual signal. The language responsiveness module 117 is used to train the system to recognize various commands.

The SHEF processor module 118 is used to receive SHEF commands and translate the SHEF commands into actual control signals within the user receiving device. Various types of SHEF commands for controlling various aspects of the user receiving device may be performed. The SHEF processor module 118 translates the hypertext transfer protocol signals received through the network into control signals within the user receiving device 22.

The tuner 120 receives the signal or data from the individual channel. The tuner 120 may receive television programming content, program guide data or other types of data. The demodulator 122 demodulates the signal or data to form a demodulated signal or data. The decoder 124 decodes the demodulated signal to form decoded data or a decoded signal. The controller 114 may be similar to that found in current DIRECTV® set top boxes which uses a chip-based multifunctional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may actually be a plurality of different types of memory including the hard drive, a flash drive and various other types of memory. The different boxes represented in the memory 130 may be other types of memory or sections of different types of memory. The memory 130 may be non-volatile memory or volatile memory.

The memory 130 may include storage for content data and various operational data collected during operation of the user receiving device 22. The memory 130 may also include advanced program guide (APG) data. The program guide data may include various amounts of data including two or more weeks of program guide data. The program guide data may be communicated in various manners including through the satellite 18 of FIG. 1. The program guide data may include a content or program identifiers, and various data objects corresponding thereto. The program guide may include program characteristics for each program content. The program characteristic may include ratings, categories, actor, director, writer, content identifier and producer data. The data may also include various user profiles such as other settings like parental controls.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated.

The user receiving device 22 may include a voice converter such as a microphone 140 in communication with the controller 114. The microphone 140 receives audible signals and converts the audible signals into corresponding electrical signals. Typically, this is done through the use of a transducer or the like. The electrical signal corresponding to the audible may be communicated to the controller 114. The microphone 140 is an optional feature and may not be included in some examples as will be described in detail below. The electrical signal may also be process in a remotely located language processing module. Thus, the controller 114 may convert the electrical signal into a ".wav" file or other suitable file type suitable for communication through a network 50.

The user receiving device 22 may also include a user interface 150. The user interface 150 may be various types or combinations of various types of user interfaces such as but not limited to a keyboard, push buttons, a touch screen or a remote control. The user interface 150 may be used to select a channel, select various information, change the volume, change the display appearance, or other functions. The user interface 150 may be used for generating a selection signal for selecting content or data on the display 40.

A network interface 152 may be included within the user receiving device 22 to communicate various data through the network 50 illustrated above. The network interface 152 may be a WiFi, WiMax, WiMax mobile, wireless, cellular, or other types of communication systems. The network interface 152 may use various protocols for communication therethrough including, but not limited to, hypertext transfer protocol (HTTP).

A Bluetooth® module 154 may send and receive Bluetooth® signals to or from the mobile device or wearable device.

A remote control device 160 may be used as a user interface for communicating control signals to the user receiving device 22. The remote control device may include a keypad 162 for generating key signals that are communicated to the user receiving device 22. The remote control device may also include a microphone 164 used for receiving an audible signal and converting the audible signal to an electrical signal. The electrical signal may be communicated to the user receiving device 22.

The user receiving device 22 may also include a profile manager 170. The profile manager 170 may use various profiles for operating and generating displays of the user receiving device. For example, the user receiving device 22 may have various users associated therewith. Each user may have a user data such as a profile that is used to operate the device to provide a customized user experience. The profiles may be used to set various operations of the user receiving device 22 such as, but not limited to, a list of favorite channels, a list of operational settings of the user receiving device, a recorded program playlist, and recommendation characteristics. The recommendation characteristics may be stored while the user is associated with the user receiving device by tuning or recording various programming. User profiles may be changed in response to the user's actions at the user receiving device 22. The user settings may be established for the language, the parental controls, and other user established settings. By storing any user established settings or adjustments, a profile can easily configure the user receiving device and provide a consistent user experience without the user having to provide inputs by scrolling through various menus at each television watching experience.

The profile manager module 170 may receive the various user data or profiles that are stored within the memory 130. The user profiles may also be stored within the head end and communicated to the user receiving device. A new user may have a user profile or user data communicated from the head end or always communicated from the head end when the user is identified to the user receiving device. As will be mentioned below, the user may be identified to the user receiving device 22 through a user identifier such as a numerical code, a user name, or an identifier associated with a mobile or wearable user receiving device.

A reminder module 172 may also be included within the controller of the user receiving device 22. The reminder module 172 may be associated with a time clock or other device for generating a reminder set by a user. The reminder module 172 may generate a screen display on the display 38 or generate a signal communicated to the wearable device 36 that corresponds to a reminder and provides various choices, such as record or tune, to the user.

The remote control 160 (and/or the user interface 150) according to the principles of the present disclosure includes a bookmark button. For example, the keypad 162 may include the bookmark button. Further, the remote control 160 (and/or the user interface 150) may be configured to receive a bookmark voice command, which is converted by the microphone 164 (or a microphone of the user interface 150) into a bookmark request signal. The user interface 150 communicates the bookmark request signal to the controller 114, which associates the bookmark request signal with the particular scene or instance of the content currently being provided to the user.

For example, the controller 114 may include a bookmark generation module 174 that receives the bookmark request signal. The bookmark generation module 174 may also be in communication with other components of the controller 114, the demodulator 122, the decoder 124, etc. Accordingly, the bookmark generation module 174 may be configured to generate a bookmark based on the bookmark request signal received from the user interface 150 and a particular scene and/or time of the displayed content. For example only, the bookmark request signal may include a timestamp (e.g., real-time and/or relative to the content) that is generated by the user interface 150, the controller 114, or other component of the user receiving device 22. Alternatively, the bookmark generation module 174 may simply associate the bookmark with a time that the bookmark request signal was received from the user interface 150.

In this manner, the bookmark generation module 174 generates the bookmark having an association with a particular scene or time corresponding to when the bookmark button was pressed by the user. For example only, the bookmark may include an identifier of the content (e.g., identifier of a movie, program, etc.) and an indicator of a time that the bookmark button was pressed (e.g., a real-time counter value and/or timer value associated with a running time of the content). The bookmark may also include an identifier of the current user.

The user receiving device 22 transmits the bookmark to be stored in the cloud. For example, the user receiving device 22 may transmit the bookmark via the network interface 152. In some implementations, bookmarks may also be stored within the user receiving device 22. For example, the user receiving device 22 may buffer the bookmarks for a predetermined period, or may store the bookmarks in the event that the network interface 152 is presently inoperable.

Figure 3:
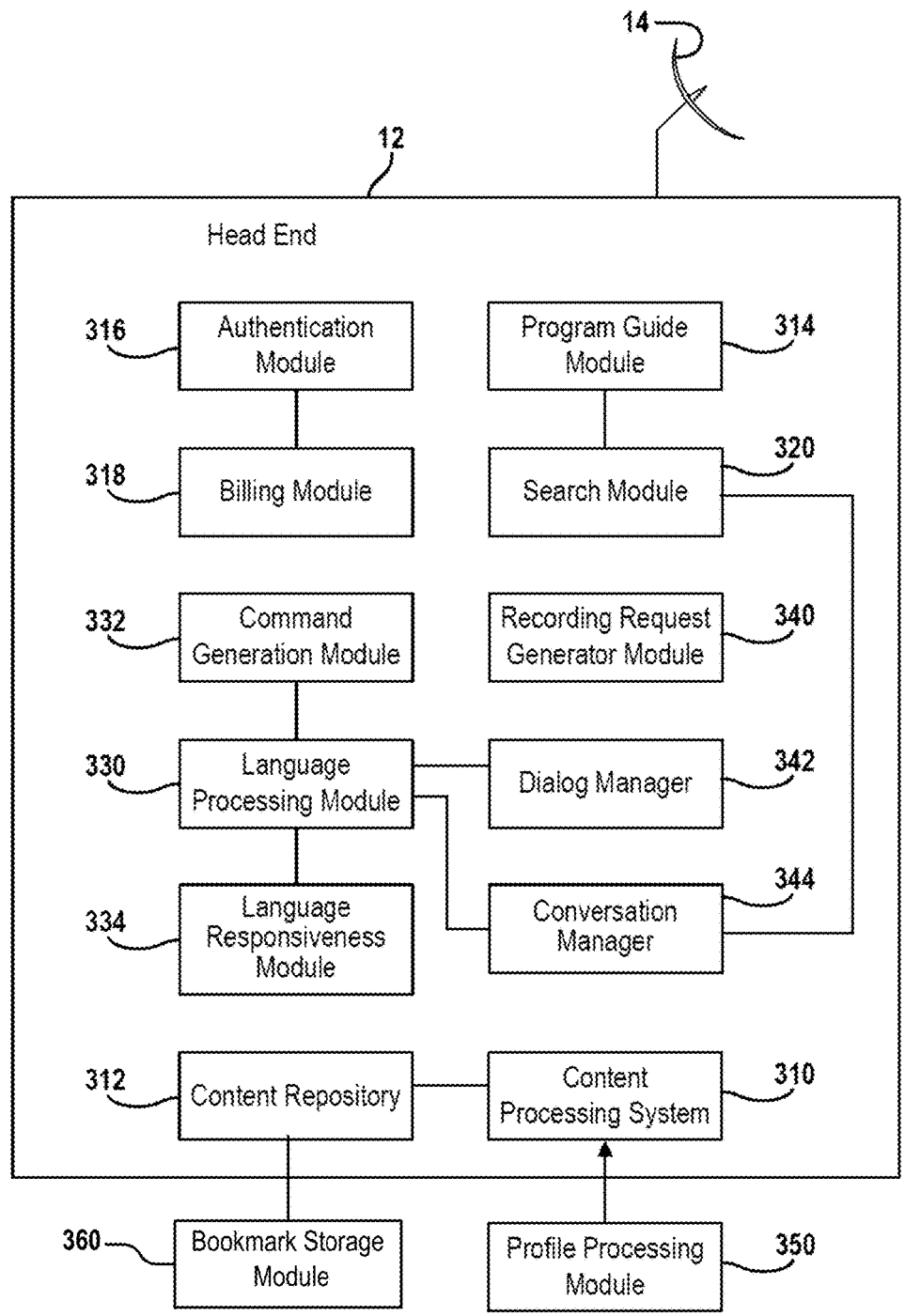
FIG. 3 is a block diagrammatic view of a head end according to one example of the present disclosure.

Referring now to FIG. 3, the head end 12 is illustrated in further detail. The head end 12 may include various modules for intercommunicating with the mobile device 34 and the user receiving device 22 illustrated in FIG. 1. Only a limited number of interconnections of the modules are illustrated in the head end 12 for drawing simplicity. Other interconnections may, of course, be present in a constructed example. The head end 12 receives content from the content provider 54 illustrated in FIG. 1. A content processing 310 processes the content for communication through the satellite 18. The content processing system 310 may communicate live content as well as recorded content. The content processing system 310 may be coupled to a content repository 312 for storing content therein. The content repository 312 may store and process On-Demand or Pay-Per-View content for distribution at various times. The Pay-Per-View content may be broadcasted in a linear fashion (at a predetermined time according to a predetermined schedule). Linear content is presently broadcasting and may also be scheduled in the future. The content repository 312 may also store On-Demand content therein. On-Demand content is content that is broadcasted at the request of a user receiving device and may occur at any time (not on a predetermined schedule). On-Demand content is referred to as non-linear content.

The head end 12 also includes a program guide module 314. The program guide module 314 communicates program guide data to the user receiving device 22 illustrated in FIG. 1. The program guide module 314 may create various objects that are communicated with various types of data therein. The program guide module 314 may, for example, include schedule data, various types of descriptions for the content and content identifier that uniquely identifies each content item. The program guide module 314, in a typical system, communicates up to two weeks of advanced guide data for linear content to the user receiving devices. The guide data includes tuning data such as time of broadcast, end time, channel, and transponder to name a few. Guide data may also include content available on-demand and pay-per-view content An authentication module 316 may be used to authenticate various user receiving devices, mobile devices and wearable devices that communicate with the head end 12. The authentication module 316 may be in communication with a billing module 318. The billing module 318 may provide data as to subscriptions and various authorizations suitable for the user receiving devices, the mobile devices and wearable devices that interact with the head end 12. The authentication module 316 ultimately permits the user receiving devices and mobile devices to communicate with the head end 12. Authentication may be performed by providing a user identifier, a password, a user device identifier or combinations thereof.

A search module 320 may also be included within the head end 12. The search module 320 may receive a search query comprising one or more search terms from various devices such as a mobile device or user receiving device. The search module 320 may communicate search results to one of the user receiving device or the mobile device. The search module 320 may interface with the program guide module 314 or the content processing system 310 or both to determine search result data. The search results may be personalized according to personal profiles, user data and viewing habits.

The head end 12 may also include a language processing module 330. The language processing module 330 may be used to generate text signals from electrical signals that correspond to audible signals received through the network 50 from a mobile device 34 or user receiving device 22 illustrated in FIG. 1. The language processing module 330 may also be or include a voice converter. The language processing module 330 may communicate the text signals to a command generation module 332. The command generation module 332 generates a user receiving device control command that corresponds to the textual signal generated by the language processing module 330. The command generation module may include various variations that correspond to a particular command. That is, people speak in various ways throughout the country and various regions. Accents and other language anomalies may be taken into consideration within the command generation module 332. Details of this will be described further below.

The head end 12 may also include a language responsiveness module 334 that is used to improve the responsiveness of the language processing module 330 and the command generation module 332. The language responsiveness module 334 is a learning mechanism used to recognize various synonyms for various commands and associate various synonyms with various commands. The details of the language responsiveness module 334 will be described in greater detail below.

The head end 12 may also include a recording request generator module 340. Various signals may be communicated from a mobile device 34 illustrated in FIG. 1 or another networked type computing device. A request to generate a recording may be communicated to the head end 12 and ultimately communicated to the user receiving device 22. The recording request may include a user receiving device identifier and a time to initiate recording. Other data that may be included in the recording request may include a channel, a transponder, a start time, an end time, a content delivery network identifier such as an IP address and various other types of identifiers that allow the user receiving device 22 to tune and record the desired content.

The head end 12 may also include a dialog manager 342. The dialog manager 342 is used to generate a corrected text response such as a sentence in response to a search request. The corrected text response may be a grammatically corrected text response. The grammatically correct text response may be based on a classification that is derived from the received text of the original audible signal. The grammatically correct text response may also be provided in a voice signal that may be played back at the receiving device. An audible signal may be useful in a mobile device where text may not easily be reviewed without being distracted from other tasks. As will be described below, templates may be used in the dialog manager based upon identified data from the original audible request. The output of the dialog manager 342, because of the grammatical correctness, may be easily be read and understood by the user of the device to which the results are returned.

The head end 12 may also include a conversation manager 344. The conversation manager is used to determine whether a second search request is related to a previous first search request. As will be mentioned in detail below, the conversation manager 344 determines whether intents or mentions within the search request are related. The conversation manager starts a new context when the second search is not related to the first search.

The head end 12 may include a profile processing module 350. The profile processing module 350 may receive a user identifier, a device identifier or both to identify a user. The user experience of a wearable device or a set top box may be changed based upon the characteristics of a user. The profile processing module 350 may provide user characteristics to a set top box or other user receiving device 22 through the network. The profile processing module may store various types of data, including a favorite channel list, a playlist and parental settings. The profile processing module 350 may also store identifiers corresponding to content watched so that recommendations may be provided to the user. As content is watched, the content identifier and the user identifier may be communicated to the head end and stored therein. Recommendations may thus be generated for a particular user that corresponds to content of interest to the user. The head end 12 may thus store profile data or user data for all of the system users so that it may be distributed to various devices when necessary.

The search module 320, language processing module 330, the command generation module 332, the language responsiveness module 334, the dialog manager 342, the conversation manager 344 and the profile processing module 350 are illustrated by way of example for convenience within the head end 12. As those skilled in the art will recognize, these modules 320-350 may also be located in various other locations together or remote to/from each other including outside the head end 12. The network 50 may be used to communicate with modules 320-350 located outside the head end 12.

A content delivery network 352 may be in communication with a content repository 312. The content delivery network 352 is illustrated outside of the head end 12. However, the content delivery network 352 may also be included within the head end 12. The content delivery network 352 may be managed or operated by operators other than the operators of the head end 12. The content delivery network 352 may be responsible for communicating content to the various devices outside of the head end 12.

The head end 12 according to the principles of the present disclosure receives the bookmarks from the user receiving device 22 (e.g., via the network 50) and stores the bookmarks in the cloud (e.g., within a bookmark storage module 360). Although the bookmark storage module 360 is shown external to the head end 12, in embodiments the head end 12 may include the bookmark storage module 360. The bookmark storage module 360 may store each bookmark in a collection of bookmarks, and associate each collection of bookmarks with one of a plurality of respective users.

The bookmark storage module 360 is accessible to users via the head end 12, the network 50, or any other suitable communication infrastructure. Accordingly, a user can access the bookmark storage module 360 using a second screen device to review bookmarks previously created via the remote control 160 and the user receiving device 22. The user may also retrieve metadata associated with each bookmark. For example, the bookmark storage module 360 may store the metadata upon receiving the corresponding bookmark (e.g., the head end 12 may automatically transmit the metadata to the bookmark storage module 360 upon storing the corresponding bookmark to the bookmark storage module 360). Alternatively and/or additionally, the metadata may be stored within the head end 12 (e.g., in the content repository), in the content provider 54, with the data provider 56, and/or any other suitable location. Accordingly, if the metadata is not stored with the bookmark in the bookmark storage module 360, the user may selectively retrieve a desired type of metadata (and/or all available metadata) from another location while browsing the bookmarks in the bookmark storage module 360. For example, if the user selects a bookmark, the bookmark storage module 360 may retrieve all related metadata from another location and provide the metadata to the user.

Figure 4:
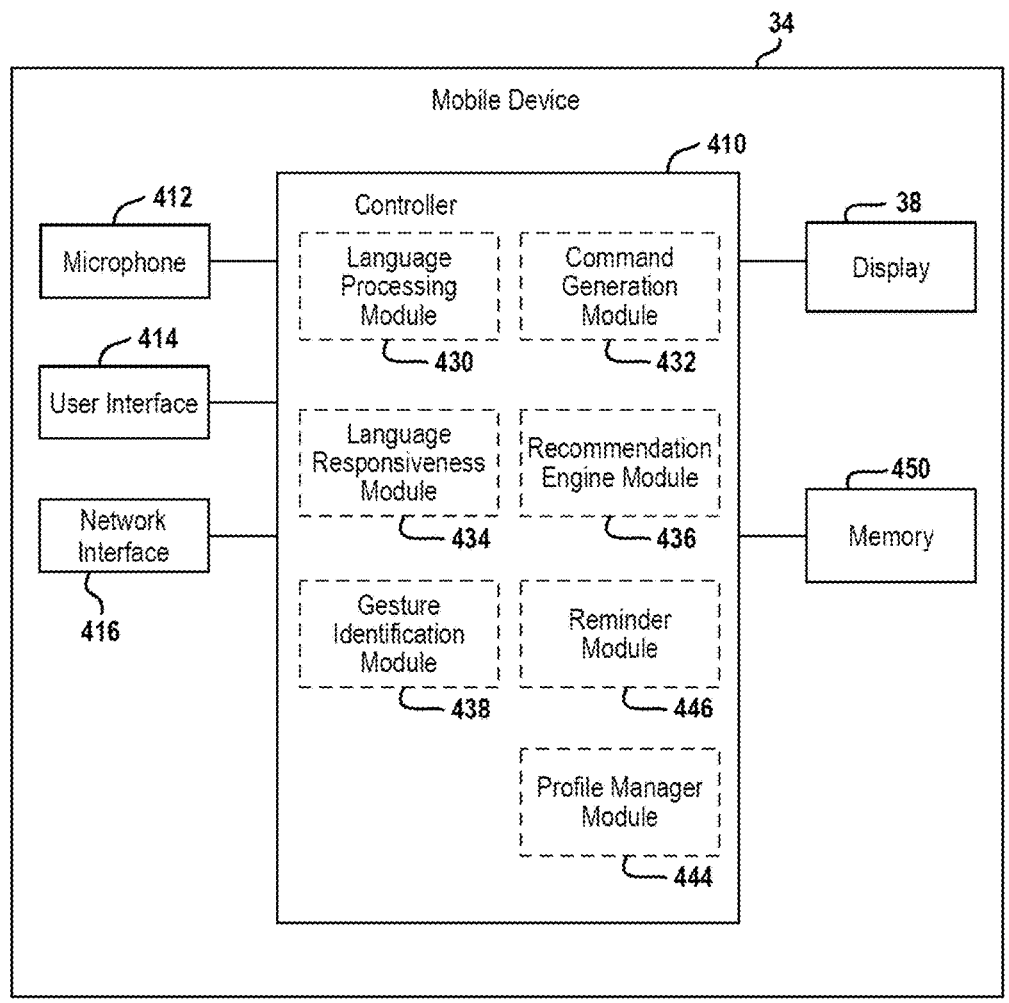
FIG. 4 is a block diagrammatic view of a mobile device according to one example of the present disclosure.

Referring now to FIG. 4, the mobile device 34 is illustrated in further detail. The mobile device 34 corresponds to a first example of a second screen device configured to access bookmarks according to the principles of the present disclosure. The mobile device 34 includes a controller 410 that controls the various functions therein. The controller 410 is in communication with a microphone 412 that receives audible signals and converts the audible signals into electrical signals. The audible signals may include a request signal. The request signal may be to perform a search, obtain guide data network data or playlist data.

The controller 410 is also in communication with a user interface 414. The user interface 414 may be buttons, input switches or a touch screen.

A network interface 416 is also in communication with the controller 410. The network interface 416 may be used to interface with the network 50. As mentioned above, the network 50 may be a wireless network or the internet. The network interface 416 may communicate with a cellular system or with the internet or both. A network identifier may be attached to or associated with each communication from the mobile device so that a determination may be made by another device as to whether the mobile device and the user receiving device are in the same local area network.

The controller 410 may also be in communication with the display 40 described above in FIG. 1.

The controller 410 may also include a language processing module 430, a command generation module 432 and a language processing module 434. Modules 430, 432 and 434 are optional components. That is, command generation and language responsiveness may be performed in remote locations such as external to the mobile device. Each of the head end 12, the user receiving device 22 or the mobile device 34 may optionally include one or more language processing module, command generation module or language responsiveness module. Also, as mentioned above, none of the devices may include the modules. Rather, the modules may be interconnected with the network 50 without residing in the head end, the user receiving device or the mobile device. Variations of this will be provided in the example set forth below.

A recommendation engine 436 may also be included within the controller 410. The recommendation engine 436 may have various data that is stored in a memory 450 of the mobile device 34. For example, selected content, content for which further data was sought, and recorded content may all be stored within the memory 450. The recommendation engine 436 may provide recommendations obtained whose content data or metadata has been obtained from the head end 12. The recommendations may be tailored to the interests of the user of the mobile device. The recommendation engine 436 may communicate the data such as the selected content, the content for which data was sought, the recorded content and the like to the head end and, in particular, the profile processing module 350.

The controller 410 may also include a gesture identification module 438 that identifies gestures performed on the display 38. For example, the gestures may be a move of dragging the user's finger up, down, sideways or holding in a location for a predetermined amount of time. A gesture performed at a certain screen may be translated into a particular command.

A profile manager 444 may store user profile data within the mobile device. The profile manager 444 may store user settings, such as favorites and parental controls. The profile manager 444 may also save relative to the recommendation engine 436 for each individual user of the mobile device. The profile manager 444 may also receive profile data from the profile processing module 350 of the head end 12 through the network.

A reminder module 446 may also be included within the controller 410 of the mobile device 34. The reminder module 446 may be associated with a time clock or other device for generating a reminder set by a user. The reminder module 446 may generate a screen display on the display 38 that corresponds to a reminder and provides various choices, such as record or tune, to the user.

Figure 5:
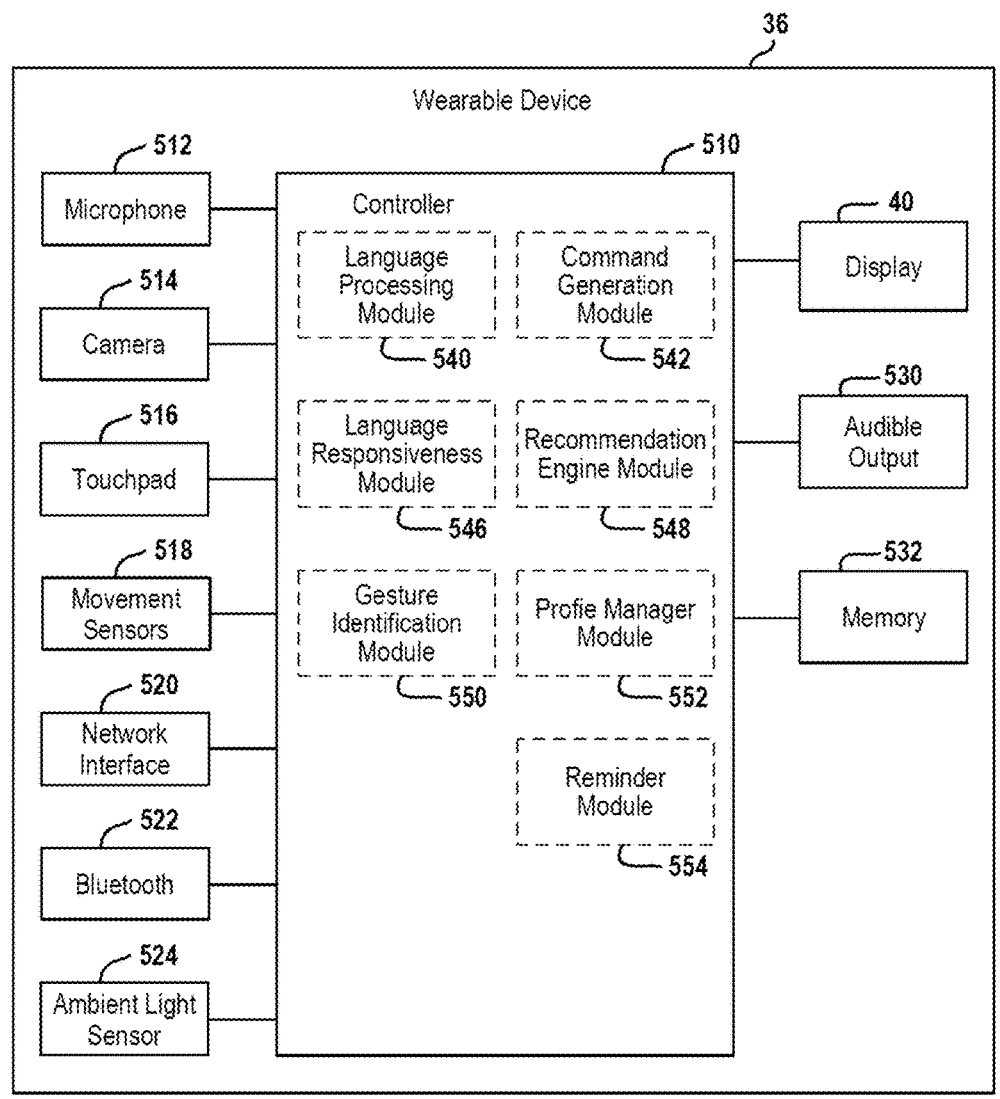
FIG. 5 is a block diagrammatic view of a wearable device according to one example of the present disclosure.

Referring now to FIG. 5, a block diagrammatic view of wearable device 36 is set forth. The wearable device 36 corresponds to a second example of a second screen device configured to access bookmarks according to the principles of the present disclosure. As mentioned above, the wearable device 36 may be one of a number of types of wearable devices including a computerized watch or wrist worn device, a head worn device such as GOOGLE GLASS® or another type of computerized device suitable to be worn or affixed to the user. The wearable device 36 may include a microphone 512 that receives audible signals and converts the audible signals into electrical signals. A camera 514 generates digital signals from a camera input. A touchpad 516 provides digital signals corresponding to the touch of a hand or finger. The touchpad 516 may sense the movement of a finger or other user input. The wearable device 36 may also include a movement sensor 518 that provides signals corresponding to movement of the device. Physical movement of the device may also correspond to an input. The movement sensors 518 may include accelerometers and moment sensors that generate signals that allow the device to know the relative movement.

The wearable device 36 may also include a network interface 520. The network interface 520 provides input and output signals to a wireless network, such as the internet. The network interface may also communicate with a cellular system.

A Bluetooth® module 522 may send and receive Bluetooth® formatted signals to and from the controller 510 and communicated them external to the wearable device 36.

An ambient light sensor 524 generates a signal corresponding to the ambient light. The ambient light sensor 524 generates a digital signal that corresponds to the amount of ambient light around the wearable device 36.

The controller 510 may also be in communication with the display 40 an audio output 530 and a memory 532. The audible output 530 may generate an audible signal through a speaker or other device. Beeps and buzzers to provide the user with feedback may be generated. The memory 532 may be used to store various types of information including a user identifier, a user profile, a user location and user preferences. Of course other operating parameters may also be stored within the memory 532.

The controller 510 may include various modules that correspond to the modules set forth in the mobile device in FIG. 4. The language processing module 540, the command generation module 542, the language responsiveness module 546, the recommendation engine module 548, the gesture identification module 550, the profile manager module 552 and the reminder module 554 correspond to the functions of the language processing module 430, the command generation module 432, the language responsiveness module 534, the recommendation engine module 436, the gesture identification module 438, the profile manager module 444 and the reminder module 446 of FIG. 4. The functions of these elements will not be repeated again.

The mobile device 34 and the wearable device 36 can be used to access the bookmarks stored in the cloud in response user input. While the mobile device 34 and the wearable device 36 are presented as example second screen devices, other second screen devices can also be used to access the bookmarks. For example only, accessing the bookmarks will be described with respect to the mobile device 34.

For example, the user may access the bookmarks by using the user interface 414, microphone 412, display 38 etc. to navigate a mobile app or website to access (e.g., log into) an account associated with the user. The bookmarks may be presented to the user on the display 38 as a list, such as a list of titles and/or a list of thumbnails images (e.g., each thumbnail image depicting an image associated with the bookmarked scene). The list of bookmarks may also include indicators of the different types of metadata available for each bookmark. Accordingly, the user can select/retrieve a bookmark and/or specific metadata using the user interface 414, and view the metadata on the display 38. The user may also manipulate the bookmarks (e.g., delete or sort the bookmarks) and share the bookmarks or metadata (e.g., via email, social media, etc.).

Figure 6:
FIG. 6 is an example screenshot illustrating navigation of bookmarks using a display of a mobile device according the present disclosure.
Figure 7:
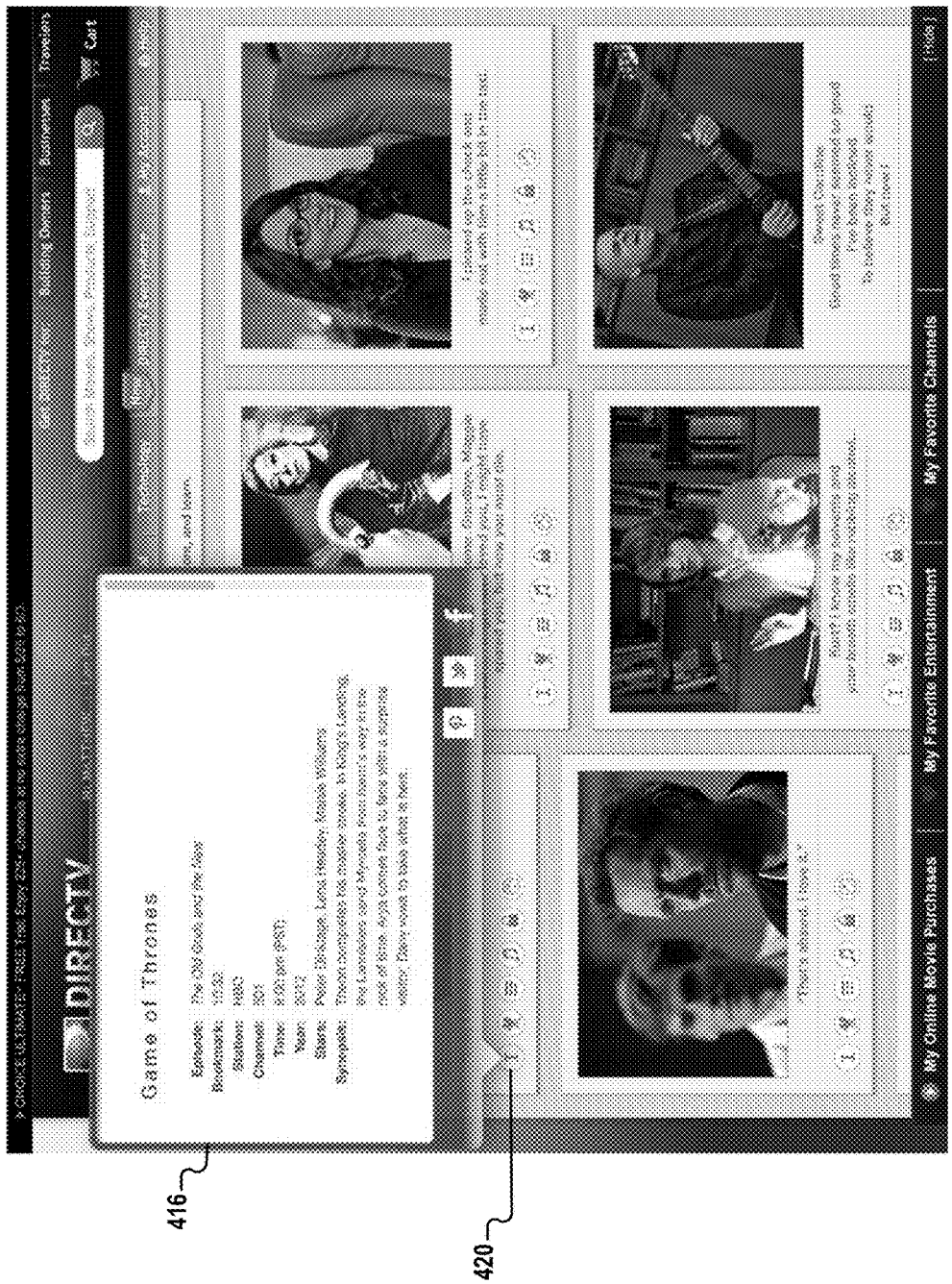
FIG. 7 is another example screenshot illustrating navigation of bookmarks using a display of a mobile device according the present disclosure.
Figure 8:
FIG. 8 is another example screenshot illustrating navigation of bookmarks using a display of a mobile device according the present disclosure.
Figure 9:
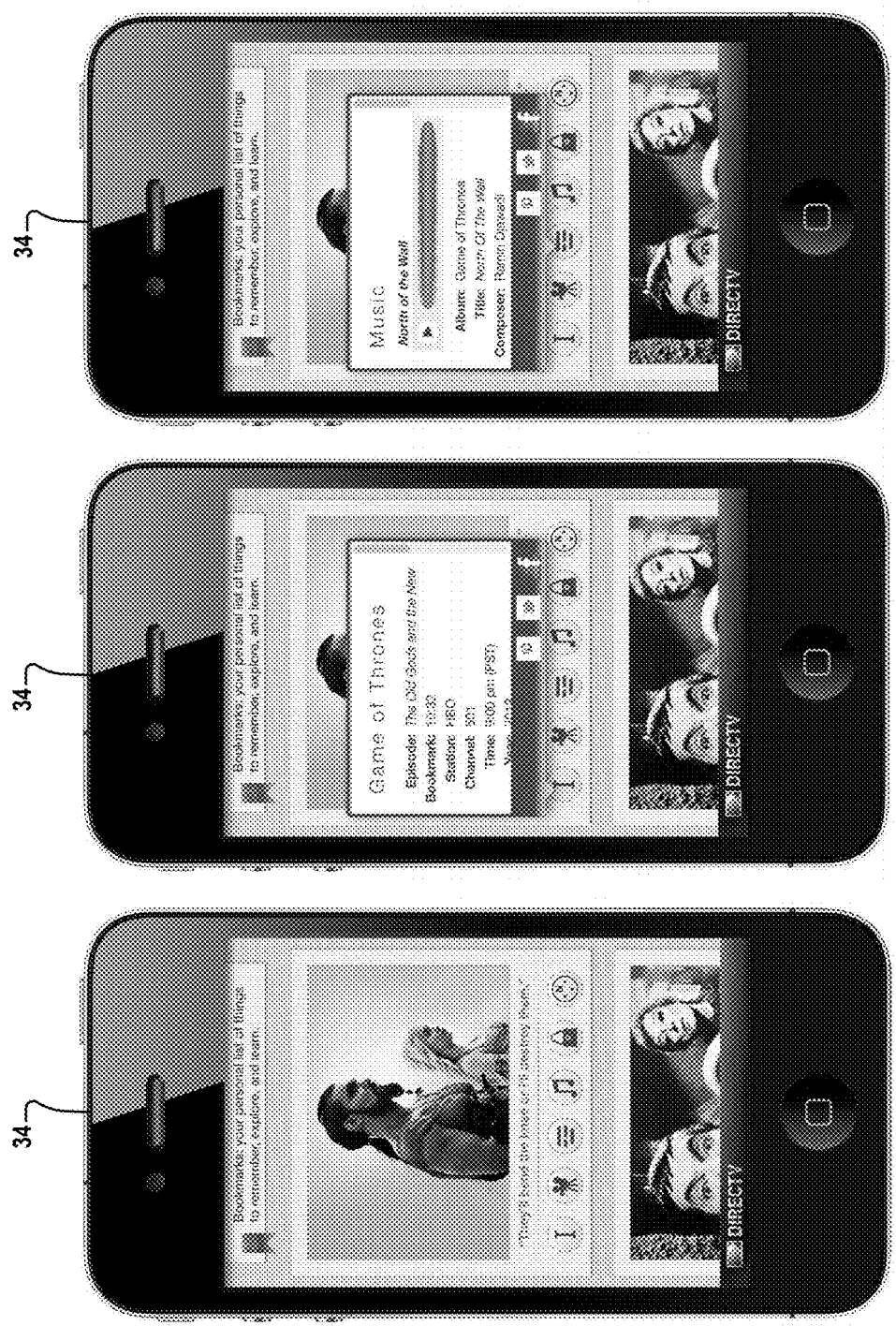
FIG. 9 illustrates additional example screenshots of navigation of bookmarks using a display of a mobile device according the present disclosure.

Referring now to FIGS. 6-9, example screenshots illustrating navigation of the bookmarks using the display 38 are shown. For example, FIG. 6 illustrates a screenshot 400 of bookmarks 404 presented as thumbnail images 408. Each bookmark 404 may include a list of icons 412 corresponding to different types of metadata available to the user. The user can select one of the icons 412 to view the corresponding metadata. FIG. 7 illustrates general information metadata 416, including a bookmark timestamp (e.g., indicating the time, 10:32, that the bookmark was created), that is displayed in response to the user selecting an "information" icon 420. FIG. 8 illustrates music metadata 424 that is displayed in response to the user selecting a music icon 428. The music metadata 424 includes an audio track that can be played by the user. For example, the audio track may correspond to music played in the scene corresponding to the bookmark. FIG. 9 illustrates the example screenshots of FIGS. 6-8 as displayed on the mobile device 34 when the mobile device 34 corresponds to a smartphone.

Figure 10:
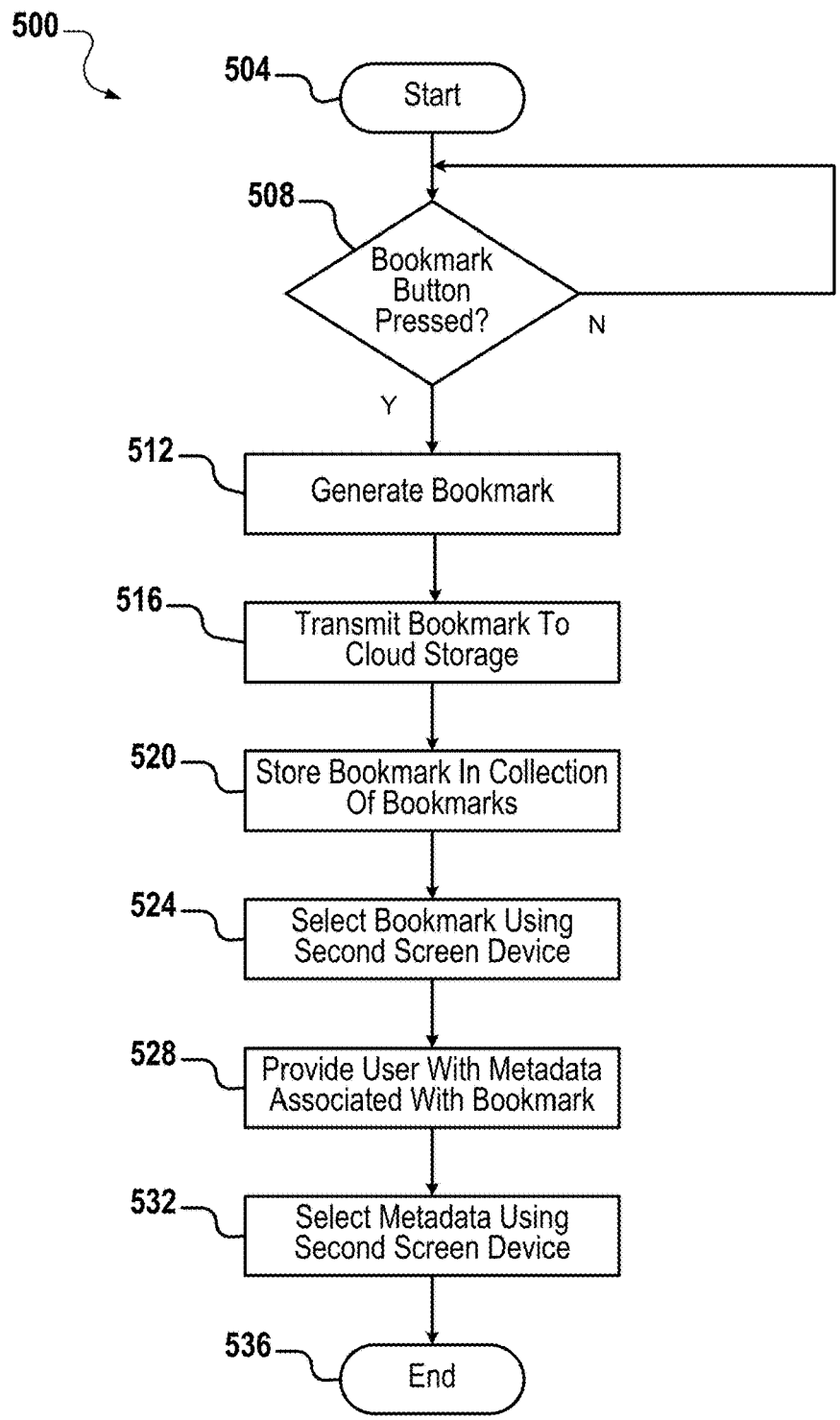
FIG. 10 is a method for generating and accessing bookmarks according to one example of the present disclosure.

Referring now to FIG. 10, an example method 500 for generating and accessing bookmarks according to one example of the present disclosure begins at 54. At 508, the method 500 determines whether a user pressed a bookmark button (e.g., on a remote control or other device). For example, a user receiving device receives a bookmark request signal generated by a remote control. If true, the method 500 continues to 512. If false, the method 500 continues to 508.

At 512, the method 500 generates a bookmark in response to the bookmark request signal. For example, the bookmark may include a timestamp indicating when the user pressed the bookmark button relative to content being presented (e.g., on a television or other media device), as well as an indication of the presented content. At 516, the method 500 transmits the bookmark to cloud storage. At 520, the method 500 stores the bookmark in cloud storage in a collection of bookmarks associated with the user.

At 524, the user selects the bookmark from the collection of bookmarks in cloud storage using a second screen device. At 528, the method 500 provides the user with one or more types of metadata associated with the selected bookmark. At 532, the user selects a desired one or more of the types of metadata associated with the selected bookmark. The method 500 ends at 536.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A system, comprising,
a user receiving device that receives content broadcast from a service provider, presents the received content on a display to be viewed by a user, receives a bookmark request signal generated in response to input from the user, generates a bookmark based on the bookmark request signal, and transmits the bookmark from the user receiving device; and
a storage device remotely located from the user receiving device, wherein the storage device receives the bookmark from the user receiving device, and stores the bookmark with a plurality of bookmarks associated with a user identifier associated with the user,
wherein the plurality of bookmarks stored in the storage device are accessible by the user using a second screen device remotely located from the user receiving device, said plurality of bookmarks have metadata and the user identifier associated therewith, said metadata having a plurality of content types corresponding to product data corresponding to products displayed within a scene corresponding to the bookmark, or product purchasing data corresponding to products displayed within the scene corresponding to the bookmark;
said second screen device communicates the user identifier to the storage device, retrieves and displays at least a first bookmark of the plurality of bookmarks based on the user identifier by simultaneously displaying a thumbnail associated with the first bookmark and a list of icons corresponding to the plurality of content types of metadata available for the first bookmark, and displays metadata of a first type associated with the first bookmark and a first icon in the list of icons upon selection of the first icon.

2. The system of claim 1, wherein the bookmark includes information identifying the content presented on the display.

3. The system of claim 1, wherein at least one of the bookmark request and the bookmark includes a timestamp indicating a time that the bookmark request signal was generated relative to the content presented on the display.

4. The system of claim 1, wherein the remote storage device corresponds to cloud storage.

5. The system of claim 1, wherein, to receive the content, the user receiving device receives the content via a satellite signal.

6. The system of claim 1, further comprising the second screen device, wherein the plurality of bookmarks stored in the remote storage device are viewable by the user at the second screen device.

7. The system of claim 6, wherein the metadata is provided to the user at the second screen device in response to the user selecting one of the plurality of bookmarks.

8. A method comprising,
receiving, using a user receiving device, content broadcast from a service provider;
presenting the received content on a display to be viewed by a user;
receiving a bookmark request signal generated in response to input from the user;
generating a bookmark based on the bookmark request signal;
transmitting the bookmark from the user receiving device; and using a storage device remotely located from the user receiving device, storing the bookmark with a plurality of bookmarks associated with a user identifier associated with the user, wherein the plurality of bookmarks stored in the storage device are accessible by the user using a second screen device remotely located from the user receiving device, said plurality of bookmarks have metadata and a user identifier associated therewith, said metadata corresponding to product data corresponding to products displayed within a scene corresponding to the bookmark, or product purchasing data corresponding to products displayed within the scene corresponding to the bookmark;

communicating the user identifier associated with the user to the storage device;

retrieving and displaying, at the second screen device, at least a first bookmark of the plurality of bookmarks based on the user identifier by simultaneously displaying a thumbnail associated with the first bookmark and a list of icons corresponding to the plurality of content types of metadata available for the first bookmark, and displays metadata of a first type associated with the first bookmark and a first icon in the list of icons upon selection of the first icon.

9. The method of claim 8, wherein the bookmark includes information identifying the content presented on the display.

10. The method of claim 8, wherein at least one of the bookmark request and the bookmark includes a timestamp indicating a time that the bookmark request signal was generated relative to the content presented on the display.

11. The method of claim 8, wherein the remote storage device corresponds to cloud storage.

12. The method of claim 8, wherein receiving the content includes receiving the content via a satellite signal.

13. The method of claim 8, further comprising accessing the plurality of bookmarks stored in the storage device using the second screen device.

14. The method of claim 13, further comprising providing the metadata to the user at the second screen device in response to the user selecting one of the plurality of bookmarks.

* * * * *